United States Patent [19]
Johnson et al.

[11] Patent Number: 5,441,302
[45] Date of Patent: Aug. 15, 1995

[54] PISTON-ACTUATED AIR BAG INFLATOR WITH HERMETIC LINER

[75] Inventors: Kelly B. Johnson, Layton; Walter A. Moore, Ogden, both of Utah; Leland B. Kort, Lakewood, Colo.; Karl K. Rink, Liberty, Utah

[73] Assignee: Morton International, Inc., Chicago, Ill.

[21] Appl. No.: 295,296

[22] Filed: Aug. 23, 1994

[51] Int. Cl.⁶ ............................................. B60R 21/26
[52] U.S. Cl. ................... 280/736; 280/737; 280/741; 222/3
[58] Field of Search ............... 280/736, 737, 741, 740, 280/742; 102/530, 531; 222/3, 5

[56] References Cited
U.S. PATENT DOCUMENTS

| | | | |
|---|---|---|---|
| 3,721,456 | 3/1973 | McDonald | 280/736 |
| 3,756,621 | 9/1973 | Lewis et al. | 280/150 |
| 5,226,561 | 7/1993 | Hamilton et al. | 280/737 X |
| 5,242,194 | 9/1993 | Popek | 280/737 |
| 5,273,312 | 12/1993 | Coultas et al. | 280/737 |
| 5,301,979 | 4/1994 | Allard | 280/737 |

*Primary Examiner*—Brian L. Johnson
*Assistant Examiner*—Christopher P. Ellis
*Attorney, Agent, or Firm*—Gerald K. White

[57] ABSTRACT

The invention is a low cost inflator having a thin-walled hermetic liner, filled with either a stored gas or a flammable fluid mixture, and having a minimal number of joints required for sealing. Structural support is provided by parts that are not required to be hermetic. To activate the inflator, a small amount of pyrotechnic is used to move a piston, crushing the thin-walled liner and compressing the stored inert gas, or alternatively compressing and igniting the stored flammable fluid mixture, causing the gas to escape into the air bag. Optionally, the stored inert gas or flammable fluid mixture can be augmented by hot gases produced by the pyrotechnic. The piston-driving material may be composed of a wide variety of pyrotechnic materials, combustible mixtures of fluid fuels and oxidants, or compatible combinations of both. The inflator design incorporating a stored combustible fluid mixture will, upon ignition of the mixture, produce a heated gas able to more quickly inflate the air bag, as compared to a cold gas or blow down system of the same size and pressure. The combustible fluid mixture is selected so that while production of undesirable incomplete products of combustion and particulate matter are minimized, the fluid mixture must be compressed to ignite, thereby eliminating storage and handling issues problematic to some inflators featuring combustible fluid mixtures.

29 Claims, 3 Drawing Sheets

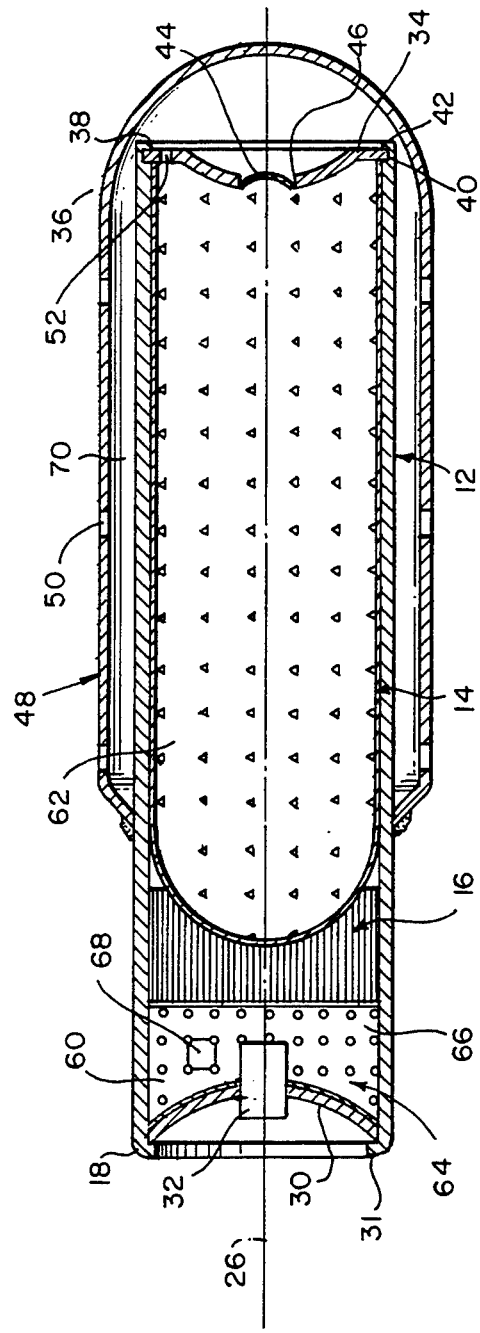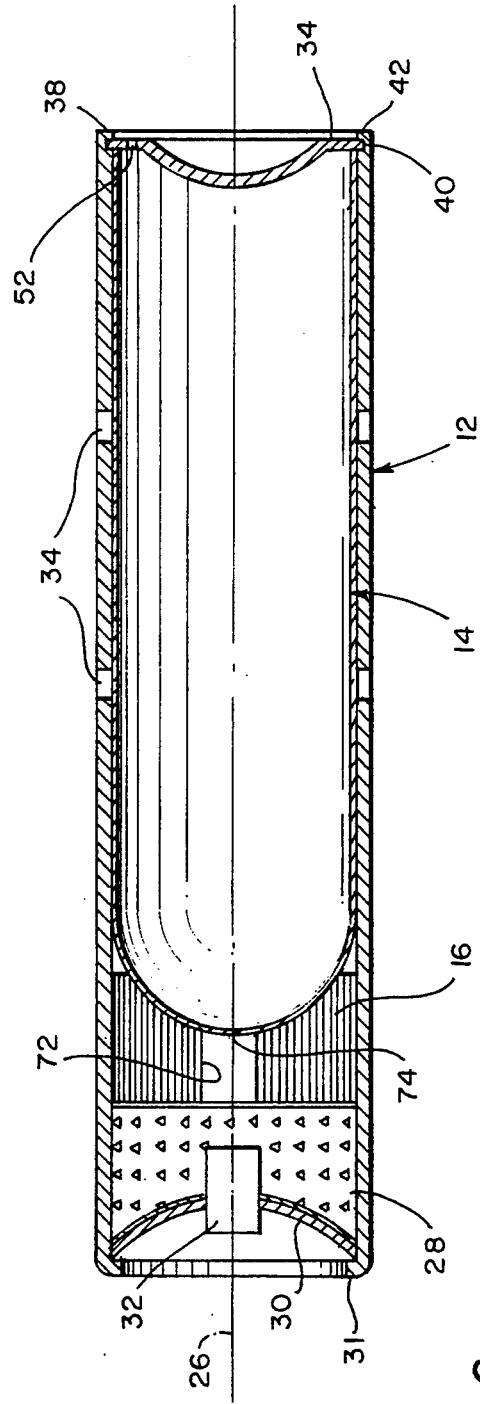

PISTON-ACTUATED AIR BAG INFLATOR WITH HERMETIC LINER

BACKGROUND OF THE INVENTION

1. Field of the Invention

The present invention relates to an inflator for an inflatable air bag, and more particularly, to such an inflator having a thin-walled hermetic liner, filled with stored gas, with a minimal number of joints required to be sealed.

2. Description of the Related Art

An inflatable air bag is a safety device for protecting automotive vehicle occupants in a collision. When a sensor discerns an imminent collision and the need for inflation of the air bag, an initiator is fired. This releases gas under high pressure from an inflator into the air bag which is initially folded. The air bag expands and provides a protective cushion that restrains the driver or passenger against various impact conditions.

Many types of inflators have been disclosed in the art for use in an inflatable restraint system. One involves the utilization of a quantity of stored compressed gas which is released at the stored temperature to inflate the air bag. Another derives a gas source from a combustible gas generating material which, upon ignition, generates a quantity of hot gas sufficient to inflate the air bag. In a third type, the air bag inflating gas results from a combination of stored compressed inert gas and a gas generating material. The last mentioned type, commonly referred to as an augmented gas or hybrid inflator, delivers hot gas to the air bag.

As noted in U.S. Pat. No. 3,756,621 granted to Donald J. Lewis, et al., on Sep. 4, 1973, the use of a quantity of compressed argon, an inert gas, is advantageous. Compressed air and compressed nitrogen have specific problems related to their use. Air is not inert and when compressed to relatively high pressure becomes a source of significant hazard. Nitrogen is relatively inert when compressed but contributes to the production of nitrogen oxide and nitrogen dioxide especially when intermixed with hot gases generated by combustible materials.

The inflator may comprise a quantity of inert gas under high pressure in a storage cylinder or bottle. An advantage accrues, however, where a stored compressed gas augmented by a generated gas is utilized. This advantage involves the addition of energy to the stored compressed gas to aid in filling the air bag. Current technology with hybrid inflators to obtain this advantage is to heat the stored high pressure gas with some type of pyrotechnic. Such hybrid inflators, however, are subject to a disadvantage, even when argon is used as the stored compressed gas, because the gas delivered to the air bag is hot and is mixed with a gas produced by combustion of the pyrotechnic. Such systems fill air bags with some types of gases, particulates or smoke that can be irritating or noxious to occupants of a vehicle.

In a recent improvement in hybrid inflator technology, as disclosed in U.S. Pat. No. 5,301,979 that on Apr. 12, 1994 was granted to John E. Allard and assigned to the assignee of the present invention, cold pressurized pure inert gas (i.e., argon, nitrogen) is delivered to an air bag by an inflator with the addition of mechanical energy instead of heat energy. The inflator comprises a high strength container having a cylindrical section that is filled with the inert gas. A piston is located at one end of the cylindrical section with a high energy pyrotechnic behind it. During storage both sides of the piston are at the same pressure. An initiator is located in the high energy pyrotechnic. A burst disk is located at the opposite end of the cylindrical section. When the initiator is fired, the piston is driven down the length of the cylindrical section. When the pressure in the container exceeds the burst disk strength, the pure inert gas expands in a blow down manner into the air bag. There is no intermixture of gases or particulates produced by the pyrotechnic.

In order to ensure operability over ten (10) or more years, the life of the vehicle in which it is installed, the container of the pressurized pure gas inflator of the Allard patent must be hermetically sealed. Also, the rate at which the air bag is filled is slower and less controllable than desirable for some purposes.

There is a need and a demand for improvement in inflators to the end of providing a simpler, less expensive assembly process and the creation of an inflator that will fill the air bag quicker than a cold gas or blow down system of the same size and pressure, wherein the production of unwanted gaseous products of combustion are eliminated, and virtually no particulate matter is produced.

A rather comprehensive disclosure regarding fluid-filled inflators is disclosed in application Ser. No. 08/252036 filed in the U.S. Patent and Trademark Office on May 31, 1994 by Karl Rink and Bradley W. Smith entitled "FLUID FUELED AIR BAG INFLATOR" and assigned to the assignee of the present invention. This disclosure comprises an apparatus and method for inflating a vehicular inflatable device that is adaptable to a variety of fuels and oxidants wherein a fluid fuel is burned and mixed with stored, pressurized gas to produce inflation gas containing little or no particulate.

SUMMARY OF THE INVENTION

It is an object of the invention to provide an inflator which meets the needs of a gas for inflating an air bag without the above-mentioned disadvantages.

Another object of the invention is to provide an inflator with a minimal number of joints required for hermetic sealing and wherein structural support is provided by parts that are not required to be hermetic.

A further object of the invention is to provide an inflator having relatively few parts, most of which are of low cost, and that is operable to fill an air bag quicker than a cold gas or blow down system of the same size and pressure and yet, in which the production of unwanted gaseous products of combustion are eliminated, and virtually no particulate matter is produced.

Still another object of the invention is to provide a low cost piston-activated, compression-ignition, fluid-filled inflator.

In accomplishing these and other objectives of the invention, there is provided an air bag inflator having a thin-walled hermetic liner, filled with stored gas, with a minimal number of joints required for hermetic sealing, as by welding. Structural support is provided by parts that are not required to be hermetic.

In order to actuate the inflator, a small amount of pyrotechnic is used to move a piston, crushing the liner and causing the stored gas to escape into the air bag. Optionally, the stored gases can be augmented by the hot gases produced by the pyrotechnic.

There is also provided a low cost inflator that uses readily available gaseous and liquid fuels and in which the stored gas is chosen such that it must be compressed to ignite.

The various features of novelty which characterize the invention are pointed out with particularity in the claims annexed to and forming a part of this specification. For a better understanding of the invention, its operating advantages, and specific objects attained by its use, reference is made to the accompanying drawings and descriptive matter in which preferred embodiments of the invention are illustrated.

BRIEF DESCRIPTION OF THE DRAWINGS

With this description of the invention, a detailed description follows with reference being made to the accompanying figures of drawing which form part of the specification, and of which:

FIG. 5 is a cross sectional side view illustrating a modification of the invention embodiment shown in FIG. 4; and FIG. 6 is a cross sectional side view illustrating an additional embodiment of the invention.

BRIEF DESCRIPTION OF THE PREFERRED EMBODIMENTS

Figure 1:
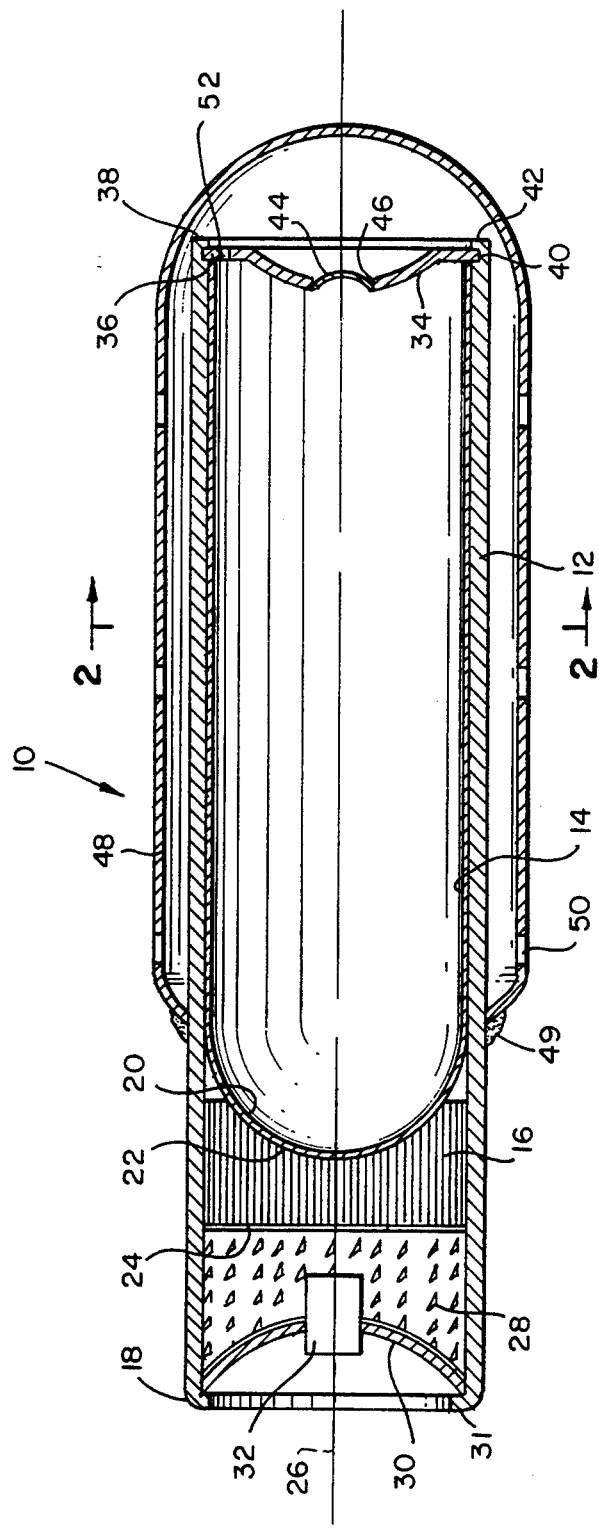
FIG. 1 is a cross sectional side view illustrating an embodiment of the present invention.
Figure 2:
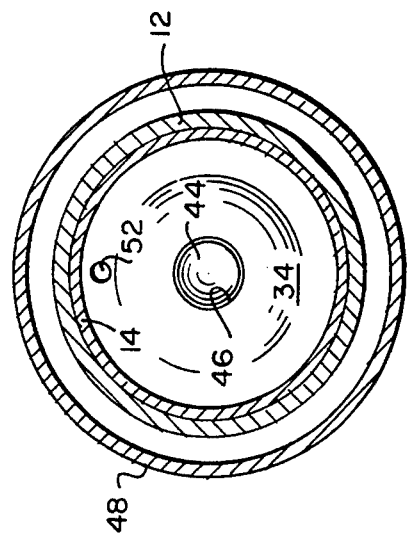
FIG. 2 is a cross sectional view taken along the lines 2—2 of FIG. 1.

Referring to the drawings, there is illustrated in FIGS. 1 and 2 an inflator assembly 10 for inflating an automotive vehicle occupant restraint such as an air bag (not shown). The inflator assembly 10 comprises a high strength container or cylindrical support tube 12. Contained within the inflator 10 backed by the support tube 12 is a cylindrical one piece liner 14 having a closed convexly shaped first end, and within which is stored pressurized gas (argon, nitrogen, air or other). The function of the liner 14 is to provide a hermetic barrier with a minimal number of potential leak paths, such as welds. The support tube 12 provides structure to the liner 14.

A piston 16 is located within the support tube 12 at a position during storage adjacent to a first end 18 of the support tube 12. On one side thereof the piston 16 is provided with a concave or hemispherical opening 20, that is, an opening that is hollow and curving inward as the interior of a sphere. The convexly shaped closed first end 22 of the cylindrical liner 14 is disposed within the concave opening 20.

As those skilled in the art will understand, it is possible to use a concavely shaped closed first end 22 of the cylindrical liner 14 into which a piston 16 having a convexly shaped portion is disposed, or a variety of other shapes. What is important is that the shapes of the liner 14 and piston 16 are closely matched.

The other side 24 of the piston 16 is planar, that is, flat, and positioned at an angle of substantially 90° with respect to a longitudinal axis 26 through the support tube 12. Contained within the support tube 12 between the end 18 thereof and the flat side or surface 24 of the piston 16 is a pyrotechnic material 28. Closing the end 18 of the support tube 12 is an inwardly curved plug 30 that is firmly secured in the first end 18 of support tube 12 by crimping indicated at 31. If deemed necessary, an environmental seal to prevent moisture penetration into the pyrotechnic material can be incorporated at the plug and piston interface. An initiator 32 for activating the pyrotechnic material 28 is located therein, being positioned in plug 30. The initiator 32 may comprise a conventional electric squib having a pair of externally extending terminals (not shown).

An end plug 34 is located at the second end 36 of the cylindrical liner 14 at a position adjacent the second end 38 of the support tube 12. The cylindrical hermetic liner 14 is welded or brazed to the end plug 34. The second end 38 of the support tube 12 is crimped to the end plug 34. That is, the interior wall of the support tube 12 for a short distance at the second end 38 thereof is milled to form a circular groove 40 into which the end plug 34 is positioned after being welded or brazed to the cylindrical liner 14. A portion 42 of the second end 38 of the support tube 12 is bent or crimped over the end plug 34 to firmly secure it in the groove 40 in the second end 38 of the support tube 12.

A burst disk 44 is located in the end plug 34. The burst disk 44 seals a release or outlet conduit 46 that is in communication with an annular diffuser 48. Diffuser 48 surrounds support tube 12, being attached thereto by a weld 49, and is in communication with an air bag (not shown) to be inflated. This attachment does not need to be hermetic and can be made using a spot weld or other suitable means. Suitably spaced orifices 50 in diffuser 48 provide diffusion of the flow of gas from the inflator 10.

A fill port 52 also is located in the end plug 34. An inert gas under high pressure (typically 4000 pounds per square inch or less in the invention embodiments of FIGS. 1 and 3) is supplied through fill port 52 to the interior of the cylindrical liner 14.

In the invention embodiments of FIGS. 4 and 5 discussed hereinafter which involve the use of flammable or combustible fluids, the pressure is significantly less than 4000 pounds per square inch and is more on the order of 250–1500 pounds per square inch.

The liner 14 is a one-piece thin-walled insert made from a crushable material. The crushability of the liner 14 may be accomplished by using a flexible material, such as a plastic or heavy paper product laminated to be hermetic, or by using a thin layer of a stiffer material, such as aluminum, similar to a soda pop can.

The support tube 12 does not need to be sealed hermetically. This allows a simpler and less expensive assembly process, for example, crimping, instead of welding. The support tube 12 also eliminates possible concerns related to exposing the pyrotechnic material 28 and initiator 32 to high storage pressures. The cylindrical liner 14 is sealed hermetically in three places: it is welded or brazed to the end plug 34, the burst disk 44 is welded or brazed to the end plug 34, and the fill port 52 is closed, as by welding, after the inflator 10 has been pressurized.

The inflator 10 is actuated by igniting the pyrotechnic material 28 with the initiator 32, creating pressure behind the piston 16. The piston moves crushing the liner and increasing the pressure of the stored gas contained within the liner 14. This causes the burst disk 44 to rupture, allowing the inert gas to flow through the resulting orifice or outlet 46 in end plug 34 into the annular diffuser 48 and subsequently through orifices 50 into the air bag (not shown). Throttling can occur at the outlet 46 thereby providing the proper fill rate for the air bag. A coarse screen, perforated metal sheet or an expanded metal ring (not shown) may be included near the burst disk 44 to prevent fragments of the burst disk 44 from entering the air bag assembly.

Figure 3:
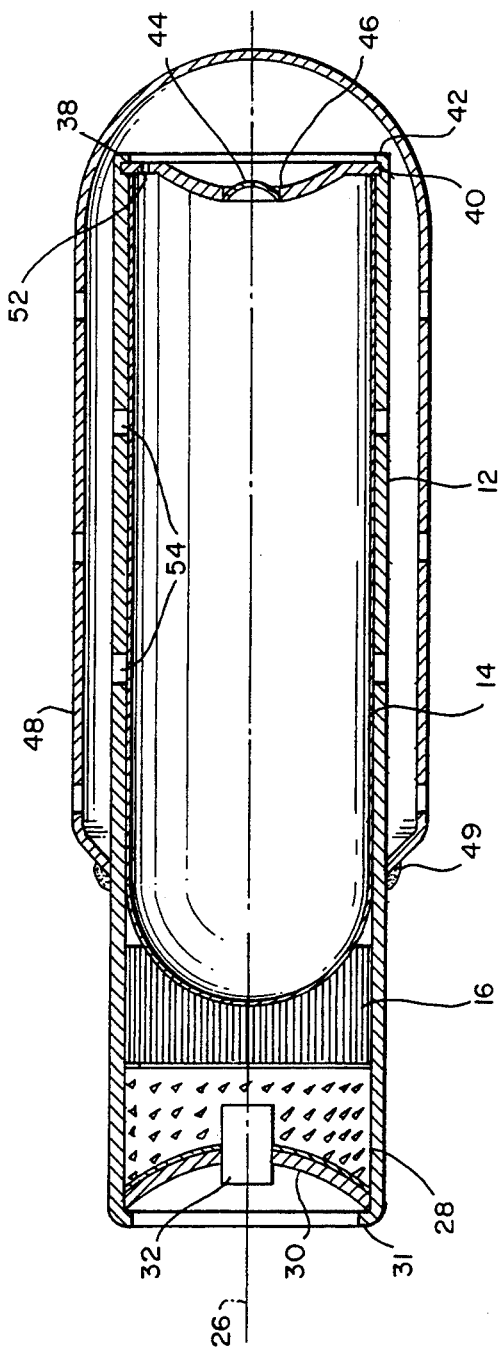
FIG. 3 is a cross sectional side view of another embodiment of the invention in which the gas flow is supplemented by hot gases produced by a pyrotechnic.

Optionally, the gas flow can be supplemented by the hot gases produced by the pyrotechnic material 28. In order to obtain this result spaced radial orifices 54 are provided in the support tube 12 as shown in FIG. 3. As the piston 16 passes the radial orifices 54 in the support tube 12, the hot gases are allowed to flow into the diffuser 48, mixing with the cold gases before entering the air bag. Radial orifices 54 can be used to provide throttling if hot gas supplements the output.

If hot gas augmentation is not needed to meet performance requirements, the ports or vents 54 in the support tube 12 may be omitted, as shown in FIG. 1. Additionally, the diffuser 48 can be changed to a smaller version at the end of the inflator or eliminated entirely. With such arrangements the pressure behind the piston 16 would bleed down through the unsealed joints of the structure after the air bag has been inflated.

The invention reduces the number of welds required to hermetically seal the stored gas and has relatively few parts. If the hot gas augmentation option is not used, the gases used to fill the air bag are clean and cool, eliminating concerns about toxicity, particulate and temperature. The inflator will fill an air bag quicker than a cold gas blow down system of the same size and pressure because pressure is increased through movement of the piston.

Figure 4:
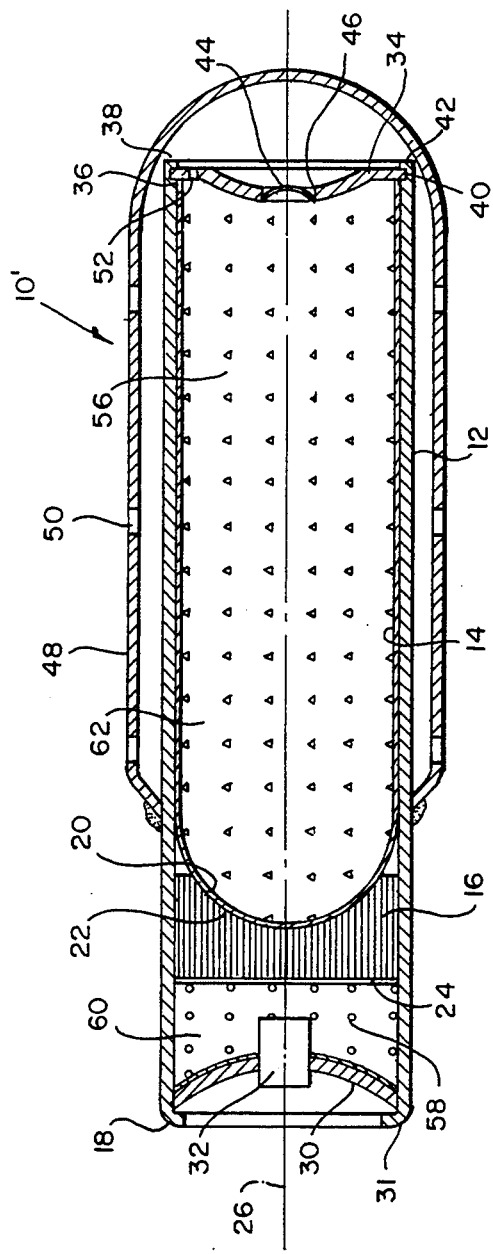
FIG. 4 is a cross sectional side view illustrating a further embodiment of the invention.

The invention embodiment illustrated in FIG. 4 for use in air bag inflatable systems is a fluid-filled gas generator. This invention embodiment, similarly to that shown in FIGS. 1 and 2, consists of an inflator 10', comprising a high strength container or cylindrical support tube 12. A cylindrical liner 14 is contained within the inflator 10' backed by the support tube 12. Stored within the cylindrical liner 14 is a combustible mixture of pressurized fluid or mixture 56. The cylindrical liner 14 provides a hermetic barrier with a minimal number of potential leak paths, such as welds. The support tube 12 provides structure to the liner 14.

Located within the support tube 12 at a position, during storage, adjacent the first end 18 of the support tube 12 is a piston 16 having a concave opening 20 into which the convexly shaped closed first end 22 of the cylindrical liner 14 is disposed. Between the other side of the piston 16, which side is flat, and the first end 18 of the support tube 12 is a pyrotechnic, combustible mixture, or hybrid mixture designated 58. An inwardly curved plug 30 closes the first end 18 of the support tube 5, being crimped thereto. Suitably located in plug 30 is an initiator 32 for activating the pyrotechnic combustible or hybrid mixture 58.

Located at the second end 36 of the cylindrical liner 14 adjacent the second end 38 of the support tube 12 is an end plug 34 to which the cylindrical liner 14 is welded or brazed. The second end 38 of the support tube 12 is crimped to the end plug 34 as described hereinbefore.

A burst disk 44, located in the end plug 34, seals a release or outlet conduit 46 that is in communication with the annular diffuser 48 having spaced orifices 50 therein for providing diffusion for the flow of gas from the inflator 10'.

A fill port 52 also is located in the end plug 34.

As in the embodiment of the invention disclosed in FIGS. 1–3, the cylindrical liner 14 is a one piece thin walled insert made from a crushable material, characterized as previously described herein. Contained within the chamber defined by cylindrical liner 14 in FIG. 4, however, is a combustible mixture 56 instead of solely an inert gas.

The invention embodiment of FIG. 4 features two chambers, one designated 60, being a relatively small chamber and contained in the support tube 12 between the plug 30 at the first end of the support tube 12 and the closed first end 22 of the cylindrical liner 14, but not including the volume of the piston 16. The second chamber, designated 62, is larger and is contained within the volume defined by the cylindrical liner 14.

In the general schematic of the invention shown in FIG. 4, the small chamber 60, for convenience designated a driving chamber, contains a pyrotechnic ignition source, the initiator 32, in direct contact with the premixed, combustible fluid 58. One end of the small chamber 60 is exposed to the flat side 24 of the piston 16.

The piston-driving combustible mixture 58 may be composed of a wide variety of fluids or fluid/solid mixtures. By way of example and not limitation, the chamber 60 may contain a liquid fuel such as ethyl alcohol in direct contact with air, oxygen or oxygen-argon mixtures used as an oxidizer in such proportions to produce a rapid reaction. Storage pressures of the oxidant may range from 200 to 2000 psi.

Alternatively, as shown in FIG. 5, a gaseous or liquid fuel 64 may be stored in the small chamber 60 with a gaseous oxidant 66 at a mixture strength not capable of sustained ignition. In this case, a third solid material 68 may be used to release a combustible gas upon either receiving heat input from the pyrotechnic and/or being exposed to water created from the pyrotechnic and from combustion products created in locally fuel-rich regions. In this manner, the overall mixture will burn rapidly as the supplemented gas is released.

A way to eliminate the possibilty of autoignition is to store fuel in an internal flexible bladder so that it is not in intimate contact with the oxidant.

Alternatively, a spark-discharge source, rather than a pyrotechnic device, may be used for ignition of specific mixtures.

Regardless of the combustible mixture composition, the pressure created by the reaction results in immediate movement of the piston 16. The piston 16, in turn, is used to crush another pressurized, combustible mixture, that designated 56 and held within the specially-designed cylindrical liner 14. This liner 14 is backed by the cylindrical support tube 12. The function of the liner 14 is to provide a hermetic barrier with a minimal number Of potential leak paths (such as welds) while the support tube 12 provides structure to the liner 14.

The crushability of the liner 14 may be accomplished by using a flexible material (such as a plastic or heavy paper material laminated to be hermetic) or by using a thin layer of stiffer material such as aluminum or steel. The support tube 12 does not need to be sealed hermetically. This allows a simpler and less expensive assembly process than that used to assemble current hybrid inflators.

The state of the combustible gas mixture 56 held within the large chamber 62 defined by the cylindrical liner 14 is chosen so that as the liner 14 is crushed by the moving piston 16, the pressure of the stored fluid in the chamber 62 increases, causing ignition of the mixture. If required, the fuel and oxidizer constituents composing the combustible material can be separated using an additional burst disk that ruptures upon piston movement, allowing oxidizer and fuel to mix and react. Subsequently, the temperature and pressure of the mixture increases dramatically and ruptures the burst disk 44 located in the end plug 34 provided in the end of the cylindrical support tube 12 and liner 14. The gases from within the liner 14 expand rapidly and flow through the annular diffuser 48 and into an air bag (not shown). The diffuser 48 is provided with a plurality of spaced orifices 50 to achieve the proper flow discharge characteristic. The annular diffuser 48 contain an oxidant 70 that is stored at low pressure to provide additional burnout of CO and unburned hydrocarbons, as well as dilution of the exhaust products.

As the combustible mixture 56 ignites, the pressure on that side of the piston becomes higher than on the other side, possibly driving the piston back in the other direction. The resulting change in volume will affect the mass flow of the gases from the liner. Initiator performance can thus be tuned by changing the mass of the piston or the load of the piston-driving pyrotechnic. These factors both affect the amount/timing of piston backlash.

The gaseous emissions characteristics of the inflator 10' can be optimized by varying not only the storage pressure, storage volume, and type of fuel and oxidizer held within the liner 14, but also by variations in the composition of the stored fluid through addition of inert diluents such as argon and nitrogen. By judicious selection of the gas type and composition, the mixture 56 stored in the cylindrical liner 14 will not ignite unless it is compressed to high pressure by the piston 16. Thus, the possibility of inadvertent ignition of the mixture 56 is eliminated.

A particular advantage of this arrangement is that the combustion products created by the process required to move the piston 16 will not enter the gas stream into the air bag. In this way, the initial piston-driving material may be a standard pyrotechnic, a combustible fluid mixture, or a hybrid system as discussed hereinbefore. The presence of the piston 16 prevents any undesired gaseous or particulate matter formed during the initial ignition process from entering the gas stored within the cylindrical liner 14.

Another advantage of this arrangement is that a wide range of fuels, oxidants and fuel/oxidant mixtures are potentially applicable. Potential fuels and oxidants include: methane, propane, ethane, ethyl alcohol, methyl alcohol, gasoline, butane, hydrogen, methanol, and air, oxygen or mixtures of oxygen and inert gas (argon, nitrogen, helium, etc.). More general names for the listed potential fuels would be hydrocarbons (paraffinic, olefinic and naphthenic), hydrocarbon derivatives (alcohols, ethers and esters). Those skilled in the art may combine various other fuels, oxidants and inert gases in a similar manner.

Thus, there has been provided, in accordance with the invention, a low cost inflator which reduces the number of welds required to hermetically seal the stored gas, and has relatively few parts. By proper selection of the gas mixture used to fill the air bag, the inflator 10' will fill the air bag quicker than a cold gas or blow down system of the same size and pressure, yet the production of unwanted gaseous products of combustion are minimized, and virtually no particulate matter is produced. Since the stored gas 56 is chosen such that it must be compressed to ignite, storage and handling problems problematic of some inflator arrangements featuring combustible fluid mixtures are eliminated. Additionally, the invention uses readily available gaseous and liquid fuels.

In the embodiment of the invention illustrated in FIG. 6, an orifice 72 is placed in the piston 16 through which the stored (inert) cold gas can escape and mix with the hot gases from the pyrotechnic 28. The liner 14 itself can serve as its own burst disk. As the piston 16 moves, the radial orifices 54 are uncovered, and the mixture escapes into the air bag (not shown). The diffuser 48 is not needed in this configuration.

Featured in the invention embodiment illustrated in FIG. 6 are the elimination from the embodiment of the invention shown in FIG. 3 of the burst disk 44 and orifice 46 in the end plate 34, and of the diffuser 48.

In the inactivated state of the pyrotechnic 28 in FIG. 6, the orifice 72 in the piston 16 is closed by the abutting end 74 of the hermetic liner 14. Inert cold gas can mix with and escape with the hot gases from the pyrotechnic material 28 through the spaced radial orifices 54 in the support tube 12 upon initiation of the pyrotechnic material by the initiator 32.

The end plug 34 in this embodiment of the invention is a simple end plug having a fill port 52 similar to that shown in FIG. 3 but having no burst disk 44 or orifice 46.

As the piston 16 moves when activated by the initiator 32, the radial holes in the support tube are uncovered as the liner 14 is crushed and ruptured. The mixture of pyrotechnic gas and gas stored in the liner 14 escapes into an air bag (not shown) through the radial holes 54.

With this description of the invention in detail, those skilled in the art will appreciate that modifications may be made to the invention without departing from the spirit thereof. Therefore, it is not intended that the scope of the invention be limited to the specific embodiments that have been illustrated and described. Rather, it is intended that the scope of the invention be determined by the scope of the appended claims.

What is claimed is:

1. An inflator for delivering pure inert cold gas to an air bag comprising,
   a cylindrical crushable hermetic liner in which a pressurized inert gas is stored,
   a non-hermetic support tube for said cylindrical liner, said support tube having a first end and a second end, including a cylindrical section in which said liner is located, and having an outlet conduit positioned at said second end, said outlet conduit being sealed by a burst disk that ruptures upon a predetermined increase of pressure of the inert gas stored in said hermetic liner,
   a piston in sealed, slidable relation over substantially the full length of said cylindrical section of said support tube, said piston during storage of said inert gas in said hermetic liner being positioned at the end of said support tube cylindrical section that is adjacent to the first end thereof,
   pyrotechnic means positioned between said piston and the first end of said support tube, and
   means for activating said pyrotechnic means to move said piston through said support tube cylindrical section, crushing said hermetic liner, increasing the pressure of the stored gas in said hermetic liner and rupturing said burst disk to cause the stored gas to escape through said outlet conduit of said support tube.

2. An inflator, as defined by claim 1,
wherein said hermetic liner is a one piece liner having a closed first end and a second end and further including,
a plug closing the second end of said hermetic liner, being welded thereto, and
wherein said support tube is crimped at the second end thereof to said plug.

3. An inflator, as defined by claim 1,
wherein said hermetic liner is a one-piece liner having a closed first end and a second end, and further including,
a first plug closing the first end of said support tube, being crimped thereto, with said pyrotechnic means being positioned between said first plug and said piston, and
a second plug closing the second end of said hermetic liner, being welded thereto,
wherein said support tube is crimped at the second end thereof to said second plug.

4. An inflator, as defined by claim 3,
wherein said burst disk is welded in said second plug.

5. An inflator, as defined by claim 3, further including,
a fill port to introduce pressurized inert gas into said hermetic liner,
wherein said fill port is welded closed in said second plug.

6. An inflator, as defined by claim 3, further including,
a fill port to introduce the pressurized inert gas into said hermetic liner,
wherein said fill port is welded closed in said second plug, and
wherein said burst disk is welded in said second plug.

7. An inflator, as defined by claim 1, further including,
an annular diffuser surrounding a portion at least of said support tube, said annular diffuser being positioned in communication with said outlet conduit at said second end of said support tube and having spaced orifices provided therein.

8. An inflator, as defined by claim 7,
wherein said support tube is provided with spaced orifices in the cylindrical section in which said hermetic liner is located,
whereby upon movement of said piston upon activation of said pyrotechnic means hot gas produced by said pyrotechnic means are allowed to flow into said diffuser mixing with the cold gases entering said diffuser from said outlet conduit thereby augmenting the stored gases by hot gases produced by said pyrotechnic means.

9. An inflator, as defined by claim 1,
wherein said hermetic liner is a one piece liner one end of which is disposed in engagement with said piston,
wherein said piston has a side that is engaged by said one end of said liner, and
wherein the contours of said one end of said liner and of said side of said piston are closely matched.

10. An inflator for delivering gas to an air bag comprising,
a cylindrical crushable hermetic liner in which pressurized gas is stored,
a non-hermetic support tube for said cylindrical liner, said support tube having a first end and a second end, including a cylindrical section in which said liner is located, and having an outlet conduit positioned at said second end, said outlet conduit being sealed by a burst disk that ruptures upon a predetermined pressure of the gas stored in said hermetic liner,
a piston in sealed slidable relation over substantially the full length of said cylindrical section of said support tube, said piston during storage of said gas in said hermetic liner being positioned at the end of said support tube cylindrical section that is adjacent to said first end thereof,
a pyrotechnic ignition source in direct contact with a premixed, combustible material positioned between said piston and the first end of said support tube, and
means for activating said pyrotechnic ignition source to move said piston through said support tube cylindrical section, crushing said hermetic liner, increasing the pressure of the stored gas in said hermetic liner and rupturing said burst disk to cause the stored gas to escape through said outlet conduit of said support tube.

11. An inflator, as defined by claim 10,
wherein said hermetic liner is a one piece liner one end of which is disposed in engagement with said piston,
wherein said piston has a side that is engaged by said one end of said liner, and
wherein the contours of said one end of said liner and of said side of said piston are closely matched.

12. An inflator, as defined by claim 11, further including,
a first plug closing said first end of said support tube with said first end of said support tube being crimped to said first plug,
wherein said hermetic liner has a closed first end and a second end, and further includes,
a second plug closing the second end of said hermetic liner, being welded thereto, and
wherein said support tube is crimped at the second end thereof to said second plug.

13. An inflator, as defined by claim 12,
wherein said premixed combustible material being composed of a variety of fluids or fluid and solid mixtures.

14. An inflator, as defined by claim 13,
wherein said premixed combustible mixture is composed of a liquid fuel such as ethanol in direct contact with air or oxygen used as an oxidizer.

15. An inflator, as defined by claim 13,
wherein said premixed combustible mixture is composed of a gaseous or liquid fuel stored with a gaseous oxidant at a mixture strength not capable of sustained ignition, and further including,
a third solid material to release a combustible gas upon receiving heat input from the pyrotechnic.

16. An inflator, as defined by claim 10, wherein the pressurized gas stored within said hermetic liner is a combustible gas mixture the state of which is chosen so that as the liner is crushed by the piston, the pressure of the stored gas increases, causing ignition of the mixture and the temperature and pressure of the gas to increase dramatically and rupture said burst disk, whereby the gases from said hermetic liner expand rapidly and escape through said outlet conduit of said support tube.

17. An inflator, as defined by claim 16, further including,
an annular diffuser surrounding a portion at least of said support tube, said annular diffuser being positioned in communication with said outlet conduit at said second end of said support tube and having spaced orifices to direct the flow of gas therefrom.

18. An inflator, as defined by claim 17, wherein said annular diffuser contains oxidant stored at low pressure to provide additional burnout of CO and hydrocarbons, as well as dilution of exhaust products.

19. An inflator, as defined by claim 1, wherein said hermetic liner is a one-piece thin-walled flexible crushable plastic product laminated to be hermetic.

20. An inflator, as defined by claim 1, wherein said hermetic liner is a one-piece thin-walled flexible crushable heavy paper product laminated to be hermetic.

21. An inflator, as defined by claim 1, wherein said hermetic liner is a one-piece thin layer of stiff aluminum material.

22. An inflator for delivering gas to an air bag comprising,
a first chamber,
a second chamber,
said first chamber being relatively small compared to said second chamber and filled with a variety of fuel and oxidant mixtures,
said second chamber being defined by a crushable cylindrical hermetic liner and filled with a premixed combustible charge,
a non-hermetic support tube for said hermetic liner including a cylindrical section in which said liner is located and having an outlet conduit, said outlet conduit being sealed by a burst disk that ruptures upon predetermined increase of pressure in said second chamber,
a piston in sealed, slidable moving relation over substantially the full length of said cylindrical section of said support tube, and
means within said first chamber to cause said piston to move and crush said crushable hermetic liner and to pressurize and cause said premixed combustible charge contained therein to ignite.

23. An apparatus for inflating an inflatable device, said apparatus comprising,
a first chamber including gas producing means, said first chamber including at least one gas exit opening and having sealing means normally closing said gas exit opening, the acutation of said gas producing means increasing the temperature and pressure within said first chamber,
opening means to open said first chamber sealing means whereby at least a portion of said hot produced gas is expelled from said first chamber,
a second chamber comprising a cylindrical crushable hermetic liner containing a supply of pressurized stored gas and a non-hermetic support tube for said hermetic liner, said support tube including a cylindrical section in which said hermetic liner is located, having a first end and a second end, and having at least one outlet orifice therein,
a piston in sealed slidable relationship over substantially the full length of said support tube, said piston during storage of said gas in said hermetic liner being positioned at the end of said support tube cylindrical section that is adjacent the first end thereof,
said first chamber including said gas producing means being located between said piston and the first end of said support tube,
means for activating said gas producing means in said first chamber to move said piston through said support tube cylindrical section, increasing the pressure of the stored gas in said hermetic liner and crushing said hermetic liner to cause said stored gas to escape through said at least one outlet orifice in said support tube to an air bag.

24. An apparatus as defined by claim 23, wherein said piston has an orifice therein that is closed by said hermetic liner until said gas producing means in said first chamber is activated to move said piston through said support tube cylindrical section and upon activation of said gas producing means the movement of said piston increases the pressure of the stored gas in said hermetic liner and crushes said hermetic liner to cause said stored gas to escape through said orifice in said piston.

25. An apparatus as defined by claim 24, wherein said at least one orifice includes a plurality of radial orifices spaced along the length of said support tube, and
wherein upon activation of said gas producing means said piston is caused to move through said support tube and as said piston moves said radial holes are uncovered and the stored gas in said hermetic liner is mixed with the hot gases from said gas producing means and escapes into an air bag.

26. An apparatus as defined by claim 22, wherein said outlet conduit in said support means is positioned at the second end thereof and is sealed by a burst disk that ruptures upon a predetermined increase of pressure of the supply of pressurized gas in said hermetic liner, and
wherein activation of said gas producing means in said first chamber to move said piston through said support tube cylindrical section increases the pressure of the stored gas in said hermetic liner and ruptures said burst disk to cause the stored gas to escape through said outlet orifice of said support tube.

27. An inflator as defined by claim 7 wherein said diffuser is crimped to said support tube.

28. An inflator as defined by claim 7 wherein said diffuser is spot welded to said support tube.

29. An inflator for delivering gas to an air bag comprising,
a cylindrical crushable hermetic liner in which pressurized gas is stored,
a non-hermetic support tube for said cylindrical liner, said support tube having a first end and a second end, including a cylindrical section in which said liner is located, and having an outlet conduit positioned at said second end, said outlet conduit being sealed by a burst disk that ruptures upon a predetermined pressure of the gas stored in said hermetic liner,
a piston in sealed slidable relation over substantially the full length of said cylindrical section of said support tube, said piston during storage of said gas in said hermetic liner being positioned at the end of said support tube cylindrical section that is adjacent to said first end thereof,
a pyrotechnic ignition source in direct contact with a separated fuel and oxidant mixture between said piston and the first end of said support tube, and means for activating said pyrotechnic ignition source to move said piston through said support tube cylindrical section, crushing said hermetic liner, increasing the pressure of the stored gas in said hermetic liner and rupturing said burst disk to cause the stored gas to escape through said outlet conduit of said support tube.

* * * * *